US005750004A

United States Patent [19]

Wurz et al.

[11] Patent Number: 5,750,004

[45] **Date of Patent: *May 12, 1998**

[54] LABEL APPLICATOR

[75] Inventors: Albert Wurz, Doylestown; Edward P. Yeh, Harleysville; Thomas J. Brobst, Allentown, all of Pa.

[73] Assignee: Accu-Sort Systems, Inc., Telford, Pa.

[ * ] Notice: The term of this patent shall not extend beyond the expiration date of Pat. No. 5,705,021.

[21] Appl. No.: 665,042

[22] Filed: Jun. 7, 1996

Related U.S. Application Data

[63] Continuation of Ser. No. 235,157, Apr. 29, 1994, abandoned.

[51] Int. Cl.$^6$ .................... B32B 31/00

[52] U.S. Cl. .................... 156/360; 156/361; 156/364; 156/384; 156/542

[58] Field of Search .................... 156/351, 360, 156/361, 362, 363, 364, 384, 510, 517, 521, 540, 541, 542

[56] References Cited

U.S. PATENT DOCUMENTS

| | | | |
|---|---|---|---|
| Re. 30,419 | 10/1980 | Crankshaw et al. | 156/249 |
| 2,535,240 | 12/1950 | Spiller et al. | 164/48 |
| 3,232,815 | 2/1966 | Klopfenstein et al. | |
| 3,329,550 | 7/1967 | Kucheck | 156/285 |
| 3,372,079 | 3/1968 | Fellner et al. | |
| 3,772,120 | 11/1973 | Radzins | 156/521 X |
| 4,017,350 | 4/1977 | Thomas | 156/363 |
| 4,046,613 | 9/1977 | Kucheck et al. | 156/249 |
| 4,089,725 | 5/1978 | Crankshaw et al. | 156/299 |
| 4,124,429 | 11/1978 | Crankshaw | 156/364 |
| 4,201,621 | 5/1980 | Crankshaw et al. | 156/567 |
| 4,255,220 | 3/1981 | Kucheck et al. | 156/285 |
| 4,267,004 | 5/1981 | Anderson | 156/361 |
| 4,276,112 | 6/1981 | French et al. | 156/360 |
| 4,314,869 | 2/1982 | Crankshaw | 156/215 |
| 4,321,103 | 3/1982 | Lindstrom et al. | 156/351 |
| 4,337,108 | 6/1982 | Crankshaw et al. | 156/285 |
| 4,349,405 | 9/1982 | Dudzik | 156/358 |
| 4,390,386 | 6/1983 | Bartl | 156/235 |
| 4,400,230 | 8/1983 | Wysltosky | 156/361 |
| 4,473,429 | 9/1984 | Crankshaw | 156/483 |
| 4,475,978 | 10/1984 | Bartl | 156/497 |
| 4,566,933 | 1/1986 | Crankshaw et al. | 156/444 |
| 4,612,078 | 9/1986 | Karp | 156/497 |
| 4,612,079 | 9/1986 | Ostrow | 156/497 |
| 4,615,757 | 10/1986 | Treiber | 156/350 |
| 4,707,211 | 11/1987 | Shibata | 156/354 |
| 4,830,701 | 5/1989 | Crankshaw et al. | 156/448 |
| 4,842,660 | 6/1989 | Voltmer et al. | 156/64 |
| 4,844,771 | 7/1989 | Crankshaw et al. | 156/387 |
| 4,857,121 | 8/1989 | Markley et al. | 156/64 |
| 5,078,816 | 1/1992 | Ratermann | 156/64 |
| 5,133,827 | 7/1992 | Ratermann | 156/361 |
| 5,188,687 | 2/1993 | Baum | 156/351 X |
| 5,232,539 | 8/1993 | Carpenter et al. | 156/360 |

FOREIGN PATENT DOCUMENTS

| | | |
|---|---|---|
| 0460281 | 12/1991 | European Pat. Off. . |
| 8803034 | 5/1988 | Germany . |
| 2076549 | 12/1981 | United Kingdom . |

*Primary Examiner*—David A. Simmons
*Assistant Examiner*—Paul M. Rivard
*Attorney, Agent, or Firm*—Volpe and Koenig, P.C.

[57] ABSTRACT

A label applicator for applying a label to the top surface of an object moving along a path adjacent to the applicator. The applicator is comprised of a label printer mounted for vertical adjustment on support structure attached to a moveable frame. The printer has a label feed position and is adjusted vertically on the support to set the label feed position to an expected median article height. A label transport assembly, attached to the frame, receives and retains the label and then moves vertically and laterally from a home position, above the label feed position, to an article intercept position, where it applies the label to the moving article. The controller learns the home position and positions the label transport assembly at the home position to pick up labels. The label printer, the label transport assembly, and the moveable frame are located along side the object path such that when the label transport assembly is in the home position, the object path is vertically unobstructed.

6 Claims, 3 Drawing Sheets

LABEL APPLICATOR

This application is a continuation of application Ser. No. 08/235,157, filed Apr. 29, 1994, now abandoned.

BACKGROUND OF THE INVENTION

1. Field of the Invention

The present invention is generally directed to a label applicator which applies a label to an article moving along a known travel path. More particularly, the present invention relates to a label applicator which is used to apply shipping labels to articles being transported on a conveyor system. Most particularly, the label applicator of the present invention finds use in the application of shipping labels to tops of articles of varying heights being carried on high throughput conveyor systems.

2. Description of the Prior Art

The use of automated labeling equipment for applying labels to moving conveyor borne articles is known in the art. In one known system, the label is first printed with various label information by a label printer and the printed label is presented at the feed position where it is then retained against a grid by means of a vacuum. When the object to be labeled is moved into alignment with the label applicator, a blast of gas transfers the label to the article. One such prior art arrangement is shown in U.S. Pat. No. 3,329,550, which issued on Jul. 4, 1967.

However, when labels are to be applied to the top surfaces of packages of varying heights it is desirable to move the label retaining grid into closer proximity to the surface of the article to be labeled. One prior art device teaches the use of a plurality of hollow vacuum fingers which transfer a label to a surface and apply it by contact with the surface or with an air blast. This arrangement is disclosed in U.S. Pat. No. 4,729,362, which issued on Apr. 24, 1973. While this arrangement is satisfactory in some applications, it does not accommodate large variances in article heights.

Other label applicators, such as that disclosed by U.S. Pat. No. 4,615,757, which issued on Oct. 7, 1986, utilize a label printer mounted for horizontal movement above the conveyor with a gravity biased label applying arm which drops into contact with the article to apply the label. U.S. Pat. No. 5,232,539 discloses a movable printer/applicator head which is mounted over a conveyor and travels vertically along a fixed path to apply labels to articles of different heights.

In all of the prior art label applicators for applying labels to the tops of articles, the label printer and/or applicator are suspended above the conveyor path. This necessitates special handling for oversized packages which cannot pass beneath the labeling equipment. Additionally, the prior art label applicators which are mounted above the conveyor for top labeling of articles must travel from the label printer, which is located at a point above the maximum package height, down to the top surface of the package to apply the label, and then return to the printer for the next label. In systems where the label printer is combined with the applicator and is moved, either horizontally or vertically, into proximity with the package surface to be labeled, moving the mass of the label printer itself up and down to accommodate the various package heights requires heavy duty equipment for rapidly accelerating and decelerating the entire printer/applicator mass in high throughput applications.

Additionally, all of the prior art label printer/applicator assemblies use label stock wound on a supply reel and the spent backing strip is wound onto a take-up reel. The quantity of labels is limited by the size of the supply reel which can be accommodated by the equipment. Each time the supply reel runs out of stock, a new reel of label stock must be installed and threaded through the printer. The reels of spent backing paper must also be periodically removed.

Preferably, to maintain a high throughput of articles on the conveyor, the time between the time the application of labels on successively appearing products of different heights will be less than 1.0 seconds. Down time for adding new label stock must also be minimized.

SUMMARY OF THE INVENTION

The present invention provides a label applicator for applying a label to an article in motion along a given path. The label applicator has a label printer mounted for vertical adjustment on a support means attached to a moveable frame. The printer has a home, label feed position and is adjusted vertically on the support means to set the label feed position to an expected median article height. Label transport means, attached to the frame, learns the home position, receives and retains the label and then moves vertically and laterally to an article intercept position, where it applies the label to the moving article. The label printer, the label transport means, and the moveable frame are located along side the object path such that when the label transport means is in the home position, the object path is vertically unobstructed.

It is an object of this invention to provide a label applicator for labeling articles on a high throughput conveyor system.

It is an object of this invention to provide a label applicator which, in the home position, leaves the article path vertically unobstructed.

It is an object of this invention to provide a label applicator in which the label printer is adjustable to an expected median article height and the label applicator learns the home position.

It is an object of this invention to provide an improved means for restocking the label supply to a label applicator assembly.

DESCRIPTION OF THE PREFERRED EMBODIMENT

Figure 1:
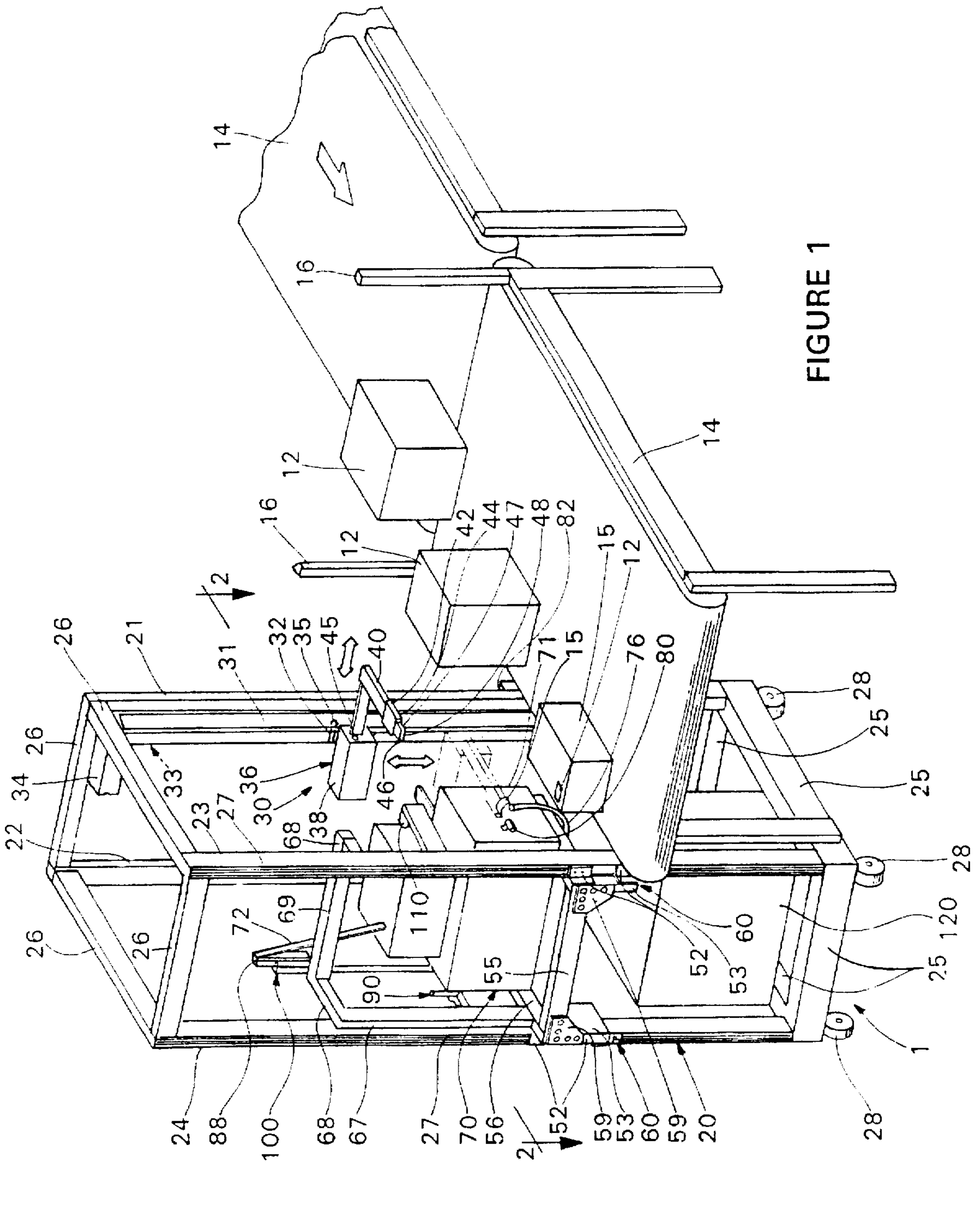
FIG. 1 is a perspective view of a label applicator in accordance with the present invention.

A label applicator 1 in accordance with the present invention is shown positioned adjacent to a conveyor 14 in FIG. 1. Preferably, articles 12 are aligned with the label applicator side of the conveyor 14 and are moved by the conveyor in the indicated direction past a plurality of sensors which detect the article height and position data. As the article passes the label applicator 1, a label 15 is placed on the top article surface.

The label applicator 1 is comprised of a box frame 20 which supports the applicator assembly 30, the printer 70 and the controller 120. The frame 20 is comprised of four vertical posts 21–24 which define the corners of the applicator assembly 1. The vertical posts 21–24 are connected by four base members 25 which define the footprint of the applicator assembly 1 and four top members 26. Posts 23 and 24 have a vertical slot 27 defined in at least one side. The frame 20 is mounted on casters 28 for movement.

The applicator assembly 30 is comprised of a vertical actuator 31 which is mounted with attachment brackets 33 to vertical post 21 adjacent to the conveyor 14. The vertical actuator 31 is driven by a servomotor 34 to vertically displace carriage 32 attached to the actuator 31. In the preferred embodiment, the vertical actuator 31 is a Macron Dynamics 6MM Linear Actuator and the servomoter 34 is a Compumotor part no. ML3475 with a BLX150 drive controller.

Figure 6:
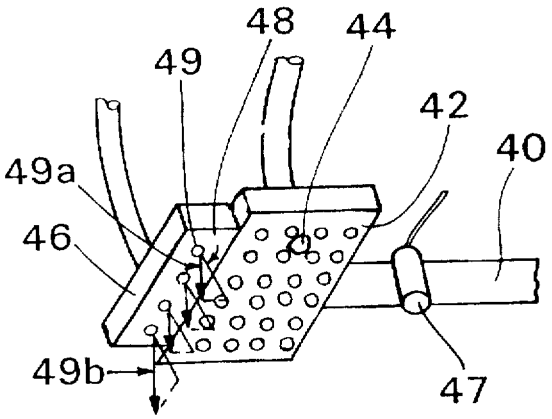
FIG. 6 is a perspective view of the vacuum/blow plate and air knife assembly.

A label transport assembly 36 is attached to the carriage 32. The transport assembly 36 has a linear actuator 38 which is horizontally mounted on the carriage 32. In the preferred embodiment, the linear actuator 38 is Bimpa part no. ULT-RAN CUL-00207-A-6. The linear actuator 38 moves an extension arm 40 between retracted and extended positions. A vacuum/blow plate 42 is attached to the extension arm 40. The vacuum/blow plate 42 has a plurality of apertures, as shown in FIG. 6, which are connected to a vacuum source and an air pressure source (not shown).

An air knife 48 is affixed to the end of the vacuum/blow plate 42. A blast of high pressure air is blown through apertures 49 of the air knife 48 after the label 15 is on the article surface to smooth the label 15 onto the surface and ensure that the label is firmly affixed. In the preferred embodiment, shown in FIG. 6, the air knife 48 has four apertures 49. The three outboard apertures 49 are set at a 20° angle 49*a* from vertical in the direction of travel of the article 12. The remaining inboard aperture 49 is set at a 20° angle toward the side of the conveyor. A reflective strip 46 is mounted on the end of the air knife 48 which is detected by the home position sensor 80.

Referring again to FIG. 1, a plurality of sensors, described below, are mounted on the carriage 32 and the transport arm assembly 36. Collision detection sensor 35 is mounted on the carriage 32 to detect if the article will strike the transport assembly 36. Label sensor 44 detects the presence of a label on the vacuum/blow plate 42. Look down sensor 47 is mounted adjacent to the vacuum/blow plate 42 to detect the presence of the article surface to be labeled. Position sensors 45 are positioned adjacent to the linear actuator 38 to detect whether the linear actuator 38 is in the extended or retracted position.

Figure 2:
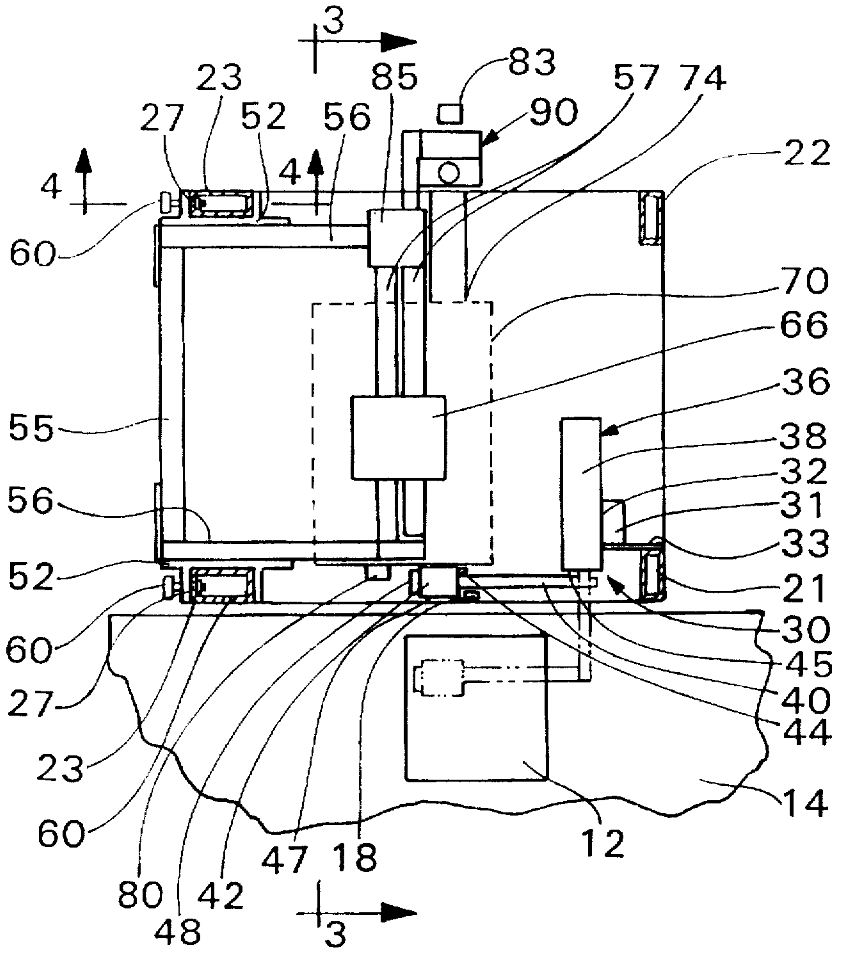
FIG. 2 is a plan view taken along line 2—2 in FIG. 1.

A vertically adjustable printer support shelf 50 is mounted between vertical posts 23 and 24. Shelf 50, shown more clearly in FIG. 2, is a rigid support which must maintain the printer 70 in a known location. In the preferred embodiment, shelf 50 is comprised of four extruded post attachments 52, which are slidably disposed on posts 23 and 24. Two post attachments 52 are attached to each vertical brace 53. A cross member 55 is attached between the vertical braces 53. Gussets 59 are used to strengthen the joint between the cross member 55 and the vertical braces 53. Longitudinal frame members 56 are attached to the upper post attachments 52 and extend in toward the center of the box frame 20. Double width printer support beams 57 are attached between the free ends of the frame members 56. A printer support plate 66 is mounted to the support beams 57. The printer 70 is affixed to the printer support 66.

Figure 4:
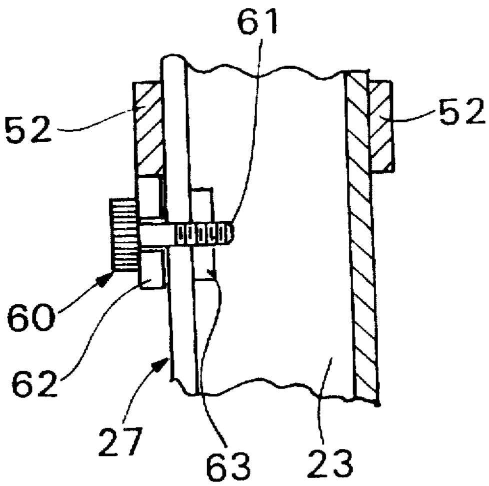
FIG. 4 is a view taken along line 4—4 in FIG. 2.

The shelf 50 is maintained in position by stopper assemblies 60 which are disposed in the slots 27 in posts 23 and 24. As shown in FIG. 4, each stopper assembly 60 is comprised of a threaded knob assembly 61 inserted through a stop plate 62. A nut 63 is installed on the knob assembly 61 and slides inside of the slot 27. The stop plate 62 can be clamped at any position along the slot 27 to support the printer shelf 50 at a desired height. The moment generated by the cantilevered mounting of the printer 70 is taken out through the vertical posts 23 and 24. As will be recognized by those skilled in the art, the spacing between the post attachments 52 on each vertical post 23 and 24 will determine the magnitude of the load induced in bending by the printer weight. The post size and the spacing of the post attachments 52 will be sufficient to accommodate the weight of and provide rigid support for a selected printer 70.

Figure 3:
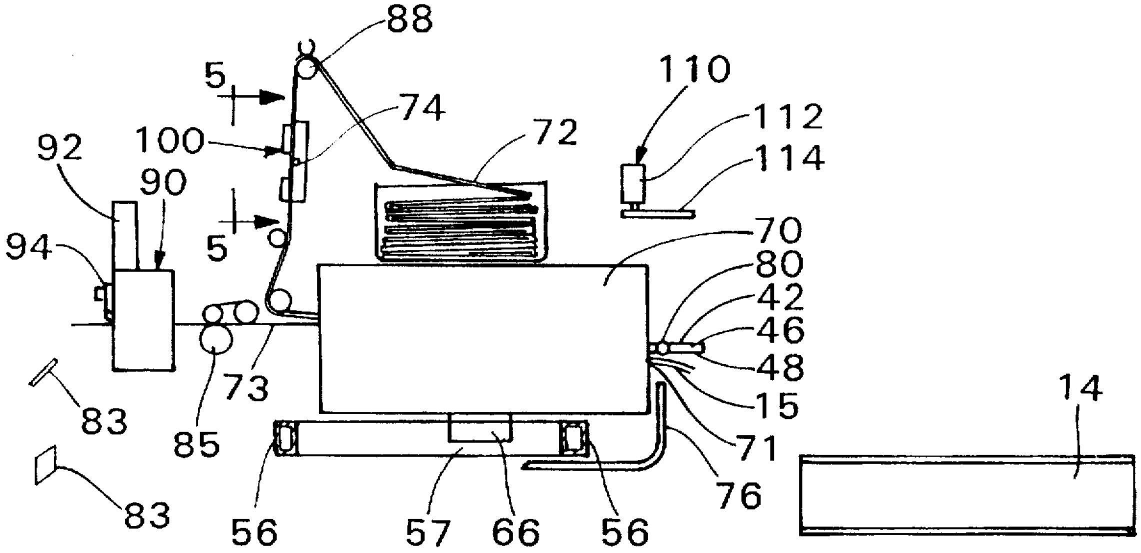
FIG. 3 is a section view taken along line 3—3 in FIG. 2.

Referring to FIG. 3, the printer feed support structure is also supported by the shelf 50. The support structure is comprised of two vertical members 67 which extend up from the longitudinal frame members 56, adjacent to the posts 23 and 24. Cantilevered frame members 68 are attached to the tops of the vertical members 67, and a cross member 69 extends between the cantilevered frame members 68. The feed rollers 88 for the label stock and the splicing fixture 100 are mounted from the support structure.

Label ready sensor 71 is mounted on the printer 70 adjacent to the label feed position of the printer 70. Home position sensor 80 is mounted adjacent to the printer 70 at the home, label pick-up position. The home position sensor 80 detects the presence of reflective strip 46 on the vacuum/blow plate 42 to signal the controller 120 when the label transport assembly 36 is in the home position. A blow tube 76 is located beneath the label feed position to provide an air blast to assist in the transfer of the label to the vacuum/blow plate 42 on the transport assembly 36.

A cutter assembly 90 having an actuator 92 and a blade 94 is mounted on the shelf 50 behind the printer 70. The label backing paper 73 is drawn through the printer 70 by a constant torque, pinch roll assembly 85 and fed into the cutter assembly 90. Actuator 92 moves the cutting blade 94 up and down to chop the continuous strip of backing paper 73 into small pieces 83 which can be collected in a bin or drawn away by a vacuum disposal system. In the preferred embodiment, the cutter assembly 90 is an Azco Sur-Cut model no. SC-2.5.

Belt speed sensor 82, shown in FIG. 1, is mounted adjacent to the conveyor belt and signals conveyor belt speed to the controller 120. Light curtain 16 which detects the article profile is attached to the conveyor. An article detection sensor 18 is located in direct alignment with the vacuum/blow plate 42 to detect when the front of the article 12 reaches this position.

As shown in FIG. 3, fan fold label stock 72 is provided to the label printer 70. In the preferred embodiment, the supply of labels is stored above the printer 70. However, the label supply may be located in any position. The backing paper 73 is discharged from the printer as the label 15 is printed. Sensor 74 detects when the label supply is out and signals the controller 120 to stop advancing the label stock 72. A new supply can then be spliced onto the existing stock without the need to rethread the label stock 73 through the printer 70.

Figure 5:
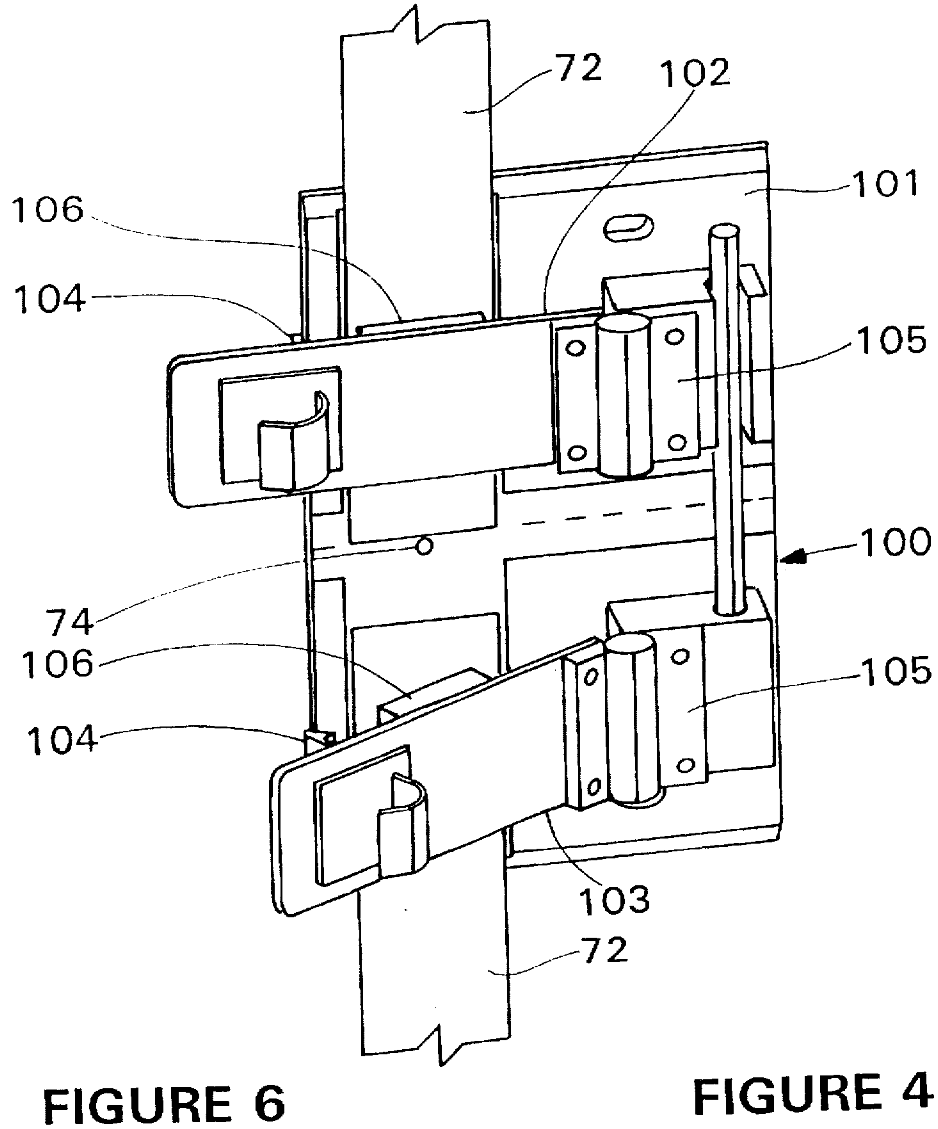
FIG. 5 is a view taken along line 5—5 in FIG. 3.

A splicing fixture 100, shown in FIG. 5, has been provided to aid in splicing the label stock 73. The splicing fixture 100 is comprised of a plate 101 upon which upper and lower clamps 102 and 103 are pivotally mounted by hinges 105. Each clamp has a latch hook 104 to secure it in the closed position. Rubber blocks 106 are attached to the clamps 102 and 103 in a position above the label stock 73, which travels in a recess 108 in the plate 101. When the clamps 102 and 103 are closed and latched, they hold the trailing end of the nearly expended label supply and the leading end of a new supply in position for tape splicing.

Referring again to FIG. 3, a label disposal assembly 110 is mounted from post 24 at a position directly above the printer 70. The label disposal assembly 110 is comprised of a rotary actuator 112 with an attached plate 114. When a label 15 cannot be applied, the rotary actuator 112 is actuated to swing the plate 114 out into the path of the retracted label transport arm 40, and the label is applied to the plate 114. In the preferred embodiment, the actuator 112 is a Turn-Act Inc. model no. 032-131-04-19.

Having provided a detailed description of the structure of the label applicator 1, a description of its operations follows with reference to FIG. 1. The printer applicator 1 is placed adjacent to a conveyor belt 14 and the conveyor belt speed sensor 82 is attached to the belt section. The height of the conveyor support assembly 50 is adjusted so that the label feed position is set to an expected median article height for the conveyor 14. The controller 120 initializes the minimum height above the conveyor 14 for the vertical actuator 31 and locates the home, label pick-up position. The home position is identified when optical sensor 80 detects the presence of the reflective strip 46 as the actuator 31 moves the label transport assembly 36 up and down. The bottom travel limit for the vertical actuator 31 is set to approximately ⅜" above the conveyor surface.

As the article 12 passes the light curtain 16, height data is collected by the light curtain 16 and signalled to the controller 120. The conveyor belt speed is also signaled to the controller 120 by the belt speed sensor 82. Label data for the article 12 is input to the controller 120 from an external device. The controller 120 directs the printer 70 to print the label for the article 12. Simultaneously, the vertical actuator 31 positions the vacuum/blow plate 42 above the home, label feed position. The position of the vacuum/blow plate can be verified by the home position sensor 80. When the label 15 is complete, it is presented at the label feed position. The controller 120 activates a vacuum through the vacuum/blow plate 42, and then a blast of air from air pressure assist tube 76 blows the label 15 up towards the vacuum/blow plate 42. The label present sensor 44 on the vacuum/blow plate 42 senses when the label 15 is retained. The vertical actuator 31 can also move the transport assembly 36 down to the label 15, and then up to pick up the label, if necessary.

The controller 120 then signals the vertical actuator 31 to move up or down based on the height data collected from the light curtain 16 to the label application height for the article 12. If the transport assembly 36 must move up to get to the proper vertical position, linear actuator 38 extends out over the conveyor 14 after the transport assembly is in the proper vertical position. if the transport assembly 36 must move downward, the linear actuator 38 is extended during the vertical travel. The collision avoidance sensor 35 located on the carriage 32 indicates if the article 12 has shifted and may strike the label transport arm 40. If a collision is imminent, the controller 120 raises and retracts the transport arm assembly 36 to avoid an impact. The article detect sensor 18 signals the controller 80 when the article 12 passes directly in front of the vacuum/blow plate 42. The look down sensor 47 then signals the controller 80 to confirm that the article surface 12 is directly below and in close proximity to the vacuum/blow plate 42. The controller 120 waits for the application point to pass under the vacuum/blow plate 42 and, when the application point is reached, reverses the vacuum to a high pressure blast of air to apply the label 15 to the article 12. The label is then smoothed down onto the article surface with a blast of air from the air knife 48 to ensure adherence.

If the transport assembly 36 is below the home/label pick-up position, the controller 12 then signals the vertical actuator 31 to move the transport arm assembly 36 vertically to the home position, and the arm 40 is retracted by linear actuator 38 after the vertical movement is completed. If the transport assembly 36 is above the home position, the arm 40 is retracted by the linear actuator 38 prior to vertical movement by the vertical actuator 31. Position senors 45 provide data to the controller 120 on the arm position. The process is then repeated for the next article 12.

If a label 15 cannot be applied, the controller 120 directs the linear actuator 38 to retract the extension arm 40. The label 15 is then carried by the vertical actuator 31 to the label disposal assembly 110. If the label transport assembly 36 is above the disposal assembly 110, the controller 120 simultaneously actuates the actuator 112 to swing the plate 114 into position as the transport assembly 36 is retracted by linear actuator 38 and moved down into a position above the plate 114. The label is then disposed of by blowing it onto the plate 114. If the label transport assembly 36 is below the disposal assembly 110, the transport assembly 36 is raised to the height of the disposal plate 114 as it is being swung into position, and the linear actuator 38 is then retracted prior to blowing the label onto the plate 114.

In the preferred embodiment, the system controller 120 utilizes an 80486 processor.

In a second embodiment of the invention, the lateral position of the article 12 is detected and signaled to the controller 120. The horizontal actuator 38 is capable of moving to multiple positions out over the conveyor and, in response to a signal from the controller 120, moves out over the conveyor to intercept the article 12. The printer support shelf height is adjusted by a lead screw with a crank to move the shelf 50 up and down. The use of a powered lead screw is also envisioned. The controller could then automatically adjust the printer height based on accumulated article height data to minimize the travel time of the transport assembly 36.

While the present invention has been described in terms of the preferred embodiments, the advantages of utilizing an applicator which does not vertically obstruct the article path as well as a height adjustable printer will be recognized by those skilled. It will be understood that the invention is not limited to the preferred embodiments, and that changes may be made herein without departing from the scope of the invention.

We claim:

1. A label applicator for applying a label to an article in motion along a given path, the applicator comprising:

label printing means, for providing a printed label at a label feed position, positioned alongside the article path in a plane parallel thereto, said means mounted for vertical adjustment to an expected median article height;

label transport means, located adjacent to the label printing means, that moves to a home position, where it is not over the article path and is aligned with the label feed position, to receive and retain a label, obtains the printed label, moves vertically to an article intercept position, and moves outwardly and over the article path to apply the label on the article;

means for locating the label feed position and transmitting label feed position data;

article detection means which provides article dimension and position data; and a controller which receives the article data, directs label printing, label transporting, and label application in accordance with that data and then returns the label transport inwardly and away from the article path.

2. The system of claim 1 further comprising a non-contact label smoothing means attached to the label transport means.

3. The system of claim 2 wherein the label smoothing means is an air knife having a plurality of apertures which expel air in the direction of article travel and at least one aperture which expels air perpendicular to the direction of article travel.

4. The system of claim 1 wherein the controller directs the label transport means back to the home position after application of the label to the article.

5. The system of claim 1 wherein the controller controls the movement of the label transport means on the basis of the article height and position data.

6. The system of claim 1 wherein the label transport means includes a collision detector means for avoiding collisions with a conveyed article.

* * * * *